Dec. 4, 1956 E. E. MASTERSON 2,773,120

MAGNETIC RECORDING OF HIGH FREQUENCY SIGNALS

Filed Nov. 30, 1950

INVENTOR
Earl E. Masterson
BY Morris [signature]
ATTORNEY

United States Patent Office 2,773,120 Patented Dec. 4, 1956

2,773,120

MAGNETIC RECORDING OF HIGH FREQUENCY SIGNALS

Earl E. Masterson, Palmyra, N. J., assignor to Radio Corporation of America, a corporation of Delaware Application November 30, 1950, Serial No. 198,370

10 Claims. (Cl. 178—6.6)

This invention relates to magnetic recording and more particularly to a means for recording high frequency signals on a magnetic record tape.

One of the principal problems involved in attempting to record television signals on magnetic tape records is that of providing means for recording the video portion of the signal. The recording system for such use must have a frequency response characteristic capable of accommodating the high frequencies contained in the video signals. In order for a picture reproduced from such recorded signals to be sharp and clear, the recording system must be capable of handling frequencies of the order of 3.5 megacycles per second. In conventional methods of recording on magnetic tape records, such a frequency response would require a linear tape speed of upwards of 290 feet per second. At such speeds, a standard 1200 foot reel of tape would have a time length of about four seconds.

It is, therefore, an object of the present invention to provide an improved means for recording high frequency signals on magnetic tape records which will not be subject to the aforementioned limitation.

More specifically, it is an object of this invention to provide an improved means for recording high frequency signals on magnetic tape records without requiring that the tape be driven at a high linear speed.

A further object of the present invention is to provide an improved means as set forth above and characterized in that the high frequency signals are television video signals.

A still further object of the present invention is to provide an improved means for simultaneously recording the audio and video portions of a television signal on a magnetic record tape.

In accomplishing these and other objects, I make use, first, of a magnetic record tape which is considerably wider than conventional tape. Secondly, I employ a pair of cylinders positioned end-to-end with a slight gap between them. A disk carrying a record-reproduce head is positioned and adapted to rotate in the gap between the two cylinders. The tape is wrapped helically once around the cylinders with its edges abutting across the gap between the cylinders. Means are provided for driving the tape longitudinally from a storage reel around the cylinders to a take-up reel. The disk carrying the sound head is driven at a relatively high speed by a constant speed motor. If, under these conditions, a series of signals is applied to the sound head, the signals will be impressed on the tape as magnetic signals in a series of parallel bands or tracks disposed diagonally with respect to the tape. With such an arrangement, the speed of rotation of the disk may be adjusted to accommodate the desired high frequency signals without imparting a high linear speed to the tape itself.

Figure 1:
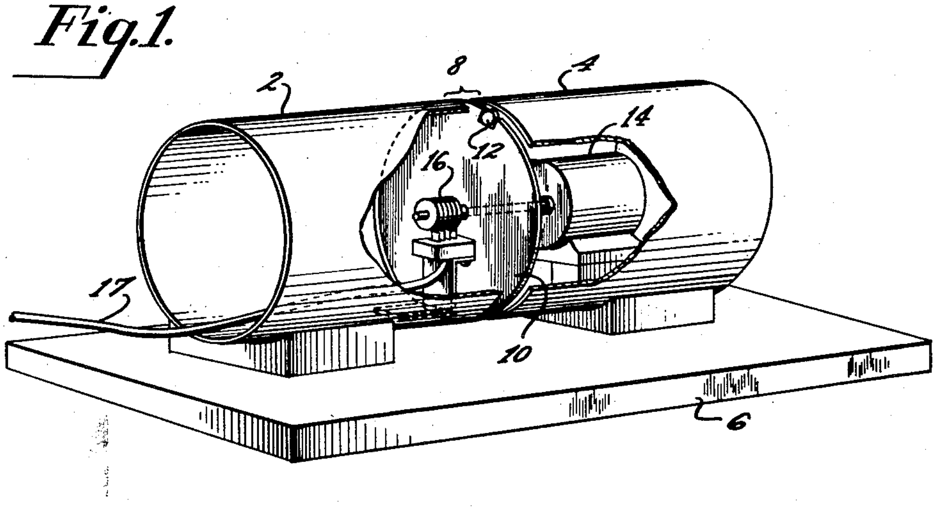
Figures 2, 3:
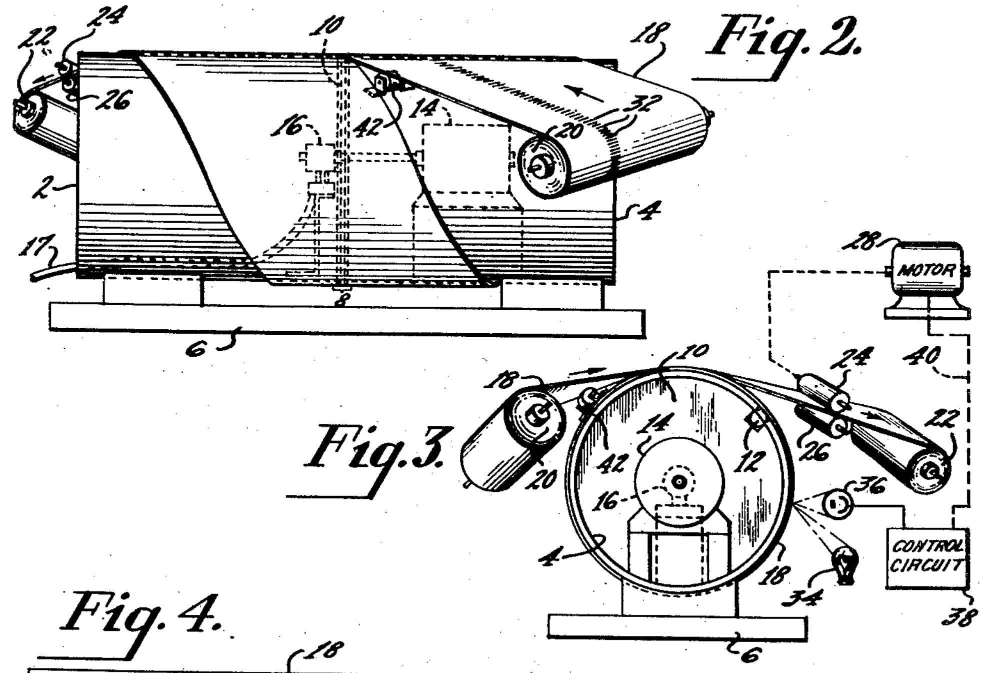
Figure 4:
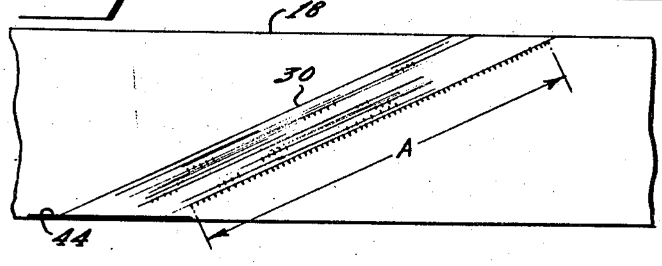

A better understanding of the present invention may be had from the following detailed description when read in connection with the accompanying drawings in which:

Figure 1 is a perspective view, partly broken away, of the main body of an apparatus made in accordance with the present invention, Figure 2 is a front view and Figure 3 an end view of the apparatus shown in Figure 1 and showing the relative position of the tape thereon, and Figure 4 is a view of a section of the tape with a representation of the record tracks impressed thereon.

Referring more particularly to the drawing, there is shown a first cylinder 2 and a second cylinder 4 mounted on a base member 6. The cylinders are of substantially identical diameter and are positioned on the base 6 in a coaxial, end-to-end relation. However, the cylinders do not abut. A small space 8 is left between the cylinders in which a rotatable member 10 carrying a recording-reproducing head 12 is mounted. A constant speed motor 14 is mounted within one of the cylinders 4 and mechanically connected to drive the rotatable member 10 in a plane normal to the axis of the cylinders. The rotatable member 10 may be in the form of a disk as shown in the drawings, or in the form of a spoked wheel or cylinder.

Signal current is conducted to or from the record-reproduce head 12 by means of a suitable device represented in the drawing by a set of slip-rings 16 located at the axis of the disk 10 and lead wires 17.

A relatively wide tape 18 is wound helically about the two cylinders for slighly more than one turn, the opposite edges of the tape abutting across the gap between the cylinders. The cylinders thus constitute a mandrel for the tape. A suitable storage spindle 20 and take-up spindle 22 are provided for the tape. The tape is pulled from the storage spindle, about the cylinders, and fed to the take-up spindle by a pair of driving rollers 24 and 26. These rollers are driven by a second motor 28.

In operation, the tape is pulled around the two cylinders 2 and 4 at a relatively low linear speed while the disk 10 bearing the record-reproduce head 12 is rotated at a relatively high speed. If signal energy is supplied to the record-reproduce head under these conditions, the signals will be recorded on the tape in a series of diagonal tracks 30, substantially as shown in Figure 4. Since the opposite edges of the tape abut across the space 8 between the cylinders, each succeeding track begins where the previous track ended.

The physical parameters of a system constructed in accordance with the present invention would depend upon the particular use for which the system is intended. For example, in recording television video signals, a frequency response of about 3.5 megacycles is required. Assuming that the response characteristic of the record-reproduce head follows the convenient rule wherein the upper limit of useful response is determined on the basis of about 1000 cycles per second for each linear inch per second of the relative motion between the head and the tape, a relative movement of about 290 feet per second is required. To satisfy this requirement, the cylinders 2 and 4, and the disk 10 may be 1.54 feet in diameter. The disk may be driven at 3600 R. P. M.

In standard television broadcasting, picture fields are transmitted at the rate of 60 per second with a vertical retrace between each field. Thus, it may be seen that one complete picture field A may be recorded during each revolution of the rotating disk, the joint between the two edges of the tape being scanned during the vertical retrace period.

To provide sufficient spacing between successive tracks on the tape, the tape is driven linearly by the driving rollers 24 and 26 which are, in turn, driven by the second motor 28. If the tape is 24 inches wide, and the dimensions of the cylinders are 1.54 feet, the record tracks on the tape will make an angle of about 25° with the edge of the tape. If the tape is then driven at a linear speed of 15 inches per second, the spacing for each track would be about 0.100 inch. Of this space, 0.070 inch may be occupied by the track itself, with 0.030 inch spacing between tracks to prevent crosstalk.

To assure proper alignment between the record tracks and the reproduce head, the linear speed of the tape must be under the control of a synchronizing system. This may be accomplished in the manner substantially as set forth in my copending application, Ser. No. 23,884, filed April 29, 1948, and entitled "Synchronous Drive Apparatus and Method," now Patent No. 2,678,821, issued May 18, 1954. This involves a series of regularly spaced bars 32 (see Fig. 2) which are printed on the back of the tape 18 in a color which contrasts with that of the background. A light source 34 and a photocell 36 cooperate to scan the printed bars as the tape moves around the cylinders. The output of the photocell is fed to a control circuit 38 where the signal produced in the photocell is compared with a standard frequency signal, and any difference between the two signals is used to control the speed of the motor drive for the driving rollers 24 and 26 through a coupling, either mechanical or electrical, represented by the broken line 40.

In order to render the system capable of recording the complete television signal, a second record-reproduce head 42 is positioned in the path of the tape to record the audio signals as a continuous track 44 along one edge of the tape. Since the linear speed of the tape is substantially 15 inches per second, standard recording-reproducing apparatus and methods may be used for the audio track. Being very narrow, the audio track would not interfere with the diagonal video tracks since it would be scanned by the video head 12 during the vertical retrace period.

Thus, it may be seen that there has been provided a novel, improved method of and means for recording high frequency signals on magnetic record tape without requiring that the tape be driven at a high linear speed.

While the invention has been described with particular reference to the recording of television signals, other uses which do not depart from the spirit and scope thereof will be readily apparent to those skilled in the art.

What is claimed is:

1. Apparatus for recording high frequency signals on a magnetic tape comprising, in combination, a pair of cylinders disposed in spaced apart, end-to-end relation, said cylinders being coaxial and substantially the same diameter and constituting a mandrel for the tape, a rotary member mounted for rotation on the common axis of said cylinders, driving means for rotating said member, a continuously operable magnetic record-reproduce head mounted on said member in a position to extend into the space between the adjacent ends of said cylinders and engage said tape when wrapped about said mandrel, and a reeling system for driving said tape helically about said mandrel.

2. Apparatus according to claim 1 wherein said member is mounted for rotation in a plane normal to said axis.

3. Apparatus for recording high frequency signals on a magnetic tape comprising, in combination, a pair of cylinders coaxially disposed in spaced apart, end-to-end relation, said cylinders being of substantially the same diameter and constituting a mandrel for the tape, a rotatable disk mounted between the adjacent ends of said spaced-apart cylinders, driving means for said disk, a continuously operable magnetic record-reproduce head mounted on the periphery of said disk, and a reeling system adapted to drive said tape helically about said mandrel, said head being positioned to engage the inner surface of said tape when it is so driven.

4. Apparatus for recording high frequency signals on a magnetic tape comprising, in combination, a pair of cylinders coaxially disposed in spaced apart, end-to-end relation, said cylinders being of substantially the same diameter and constituting a mandrel for the tape, a rotatable member mounted between the adjacent ends of said spaced apart cylinders, constant speed driving means for said rotatable member, a continuously operable magnetic record-reproduce head mounted on said rotatable member and adapted to be driven in a circular path the diameter of which is substantially the same as the diameter of said cylinders, and a reeling system adapted to drive said tape helically about said mandrel, said head being positioned to engage the inner surface of said tape when it is so driven.

5. Apparatus for recording high frequency signals on a magnetic tape comprising, in combination, a pair of cylinders coaxially disposed in spaced apart, end-to-end relation, said cylinders being of substantially the same diameter and constituting a mandrel for the tape, a rotatable member mounted between the adjacent ends of said spaced apart cylinders, constant speed driving means for said rotatable member, a continuously operable magnetic record-reproduce head mounted on said rotatable member and adapted to be driven in a circular path the diameter of which is substantially the same as the diameter of said cylinders, a reeling system adapted to drive said tape helically about said mandrel, and synchronizing means associated with said reeling system for maintaining synchronism between said tape and said head, said head being positioned to engage the inner surface of said tape when it is so driven.

6. Apparatus for translating television signals, including audio and video signals, on a magnetic tape comprising, in combination, a pair of cylinders coaxially disposed in spaced apart, end-to-end relation, said cylinders being of substantially the same diameter and constituting a mandrel for the tape, a reeling system adapted to drive said tape helically about said mandrel, a rotatable member mounted between the adjacent ends of said spaced apart cylinders, driving means for said rotatable member, a first magnetic record-reproduce head mounted on said rotatable member and adapted to be driven in a circular path the diameter of which is substantially the same as the diameter of said cylinders for recording and reproducing the video portion of the television signals, said first head being positioned to engage the inner surface of said tape, and a second magnetic record-reproduce head fixedly mounted externally of said cylinders and being adapted to engage one edge of said tape for the recordation and reproduction of the audio portion of said television signal.

7. Apparatus in accordance with claim 6 and characterized by the addition of synchronizing means associated with said reeling system for maintaining synchronism between said tape and said first head.

8. Apparatus for translating television signals, including audio and video signals, on a magnetic tape comprising, in combination, a relatively wide magnetic tape having parallel edges, a pair of cylinders coaxially disposed in spaced apart, end-to-end relation, said cylinders being of substantially the same diameter and constituting a mandrel for said tape, a reeling system adapted to drive said tape helically about said mandrel at a relatively low linear speed, opposite edges of said tape abutting between the adjacent ends of said spaced apart cylinders, a rotatable member mounted between said adjacent ends of said cylinders, means for driving said rotatable member at a relatively high constant speed, a first magnetic record-reproduce head mounted on said rotatable member and adapted to be driven in a circular path the diameter of which is substantially the same as the diameter of said cylinders for recording and reproducing the video portion of the television signals, said first head being adapted to engage the inner surface of said tape, and a second record-reproduce head fixedly mounted externally of said cylinders and adapted to engage one edge of said tape for the recordation and reproduction of the audio portion of said television signal.

9. Apparatus as set forth in claim 8 wherein the width of said tape is approximately twenty-four inches, the linear speed at which said tape is driven is approximately 15 inches per second, the diameter of the cylinders is approximately 1.54 feet, and the speed at which the rotatable member is driven is approximately 3600 revolutions per minute.

10. Apparatus for the recording of high frequency signals on magnetic tape comprising, in combination, a relatively wide magnetic tape having parallel edges, a pair of cylinders coaxially disposed in spaced apart, end-to-end relation, said cylinders being of substantially the same diameter and constituting a mandrel for said tape, a reeling system adapted to drive said tape helically about said mandrel at a relatively low speed, opposite edges of said tape abutting between the adjacent ends of said spaced apart cylinders, a rotatable member mounted between the adjacent ends of said spaced apart cylinders, means for driving said rotatable member at a relatively high constant speed, and a continuously operable magnetic record-reproduce head mounted on said rotatable member and adapted to be driven in a circular path the diameter of which is substantially the same as the diameter of said cylinders, said head being positioned to engage the inner surface of said tape.

References Cited in the file of this patent

UNITED STATES PATENTS

| | | |
|---|---|---|
| 1,707,243 | Wildhaber | Apr. 2, 1929 |
| 1,771,820 | Rtcheouloff | July 29, 1930 |
| 1,825,441 | Cawley | Sept. 29, 1931 |
| 1,945,626 | Baird | Feb. 6, 1934 |
| 2,044,831 | Chereau et al. | June 23, 1936 |
| 2,170,751 | Gabrilovitch | Aug. 22, 1939 |
| 2,245,286 | Marzocchi | June 10, 1941 |
| 2,314,834 | Kiel | Mar. 23, 1943 |
| 2,517,808 | Sziklai | Aug. 8, 1950 |
| 2,648,589 | Hickman | Aug. 11, 1953 |